United States Patent
Ock et al.

(10) Patent No.: US 12,393,369 B2
(45) Date of Patent: Aug. 19, 2025

(54) STORAGE DEVICE FOR DETERMINING SUCCESSFUL TRANSMISSION OF COMMANDS AND METHODS OF OPERATION

(71) Applicant: SK hynix Inc., Icheon-si (KR)

(72) Inventors: Eun Jae Ock, Icheon-si (KR); Jung Ae Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/526,562

(22) Filed: Dec. 1, 2023

(65) Prior Publication Data

US 2025/0060906 A1 Feb. 20, 2025

(30) Foreign Application Priority Data

Aug. 16, 2023 (KR) .......................... 10-2023-0106724

(51) Int. Cl.
*G06F 3/06* (2006.01)
(52) U.S. Cl.
CPC .......... *G06F 3/0659* (2013.01); *G06F 3/0619* (2013.01); *G06F 3/0679* (2013.01)

(58) Field of Classification Search
CPC ..... G06F 3/0659; G06F 3/0619; G06F 3/0679
See application file for complete search history.

(56) References Cited

U.S. PATENT DOCUMENTS

| | | | |
|---|---|---|---|
| 10,430,374 B2* | 10/2019 | Menachem | G06F 13/28 |
| 2006/0022054 A1 | 2/2006 | Elhamias et al. | |
| 2016/0357571 A1* | 12/2016 | Vahidsafa | G06F 13/362 |
| 2019/0179561 A1* | 6/2019 | Park | G11C 16/225 |
| 2024/0048277 A1* | 2/2024 | Li | H04L 1/1671 |

FOREIGN PATENT DOCUMENTS

KR 10-2016-0122631 A 10/2016

* cited by examiner

*Primary Examiner* — Mark A Giardino, Jr.

(57) ABSTRACT

A storage device may transmit a command set to a memory, set a plurality of flag bits based on transmission status of a plurality of commands included in the command set, respectively, and determine whether an error occurred in the process of transmitting the command set to the memory based on the plurality of flag bits. Each of the plurality of flag bits has a first value or a second value, and the command set includes a reset command, a command set start command, and a command set end command.

15 Claims, 11 Drawing Sheets

STORAGE DEVICE FOR DETERMINING SUCCESSFUL TRANSMISSION OF COMMANDS AND METHODS OF OPERATION

CROSS-REFERENCES TO RELATED APPLICATION

The present application claims priority under 35 U.S.C. § 119(a) to Korean patent application number 10-2023-0106724 filed in the Korean Intellectual Property Office on Aug. 16, 2023, which is incorporated herein by reference in its entirety.

BACKGROUND

1. Technical Field

Various embodiments generally relate to a storage device for determining the consistency of transmitted commands and methods of operating the storage device.

2. Related Art

A storage device is a device for storing data according to a request from an external device such as a computer, a mobile terminal such as a smart phone or tablet, or the like.

A storage device may further include a memory for storing data and a controller for controlling the memory. The memory may be a volatile memory or a non-volatile memory. The controller may receive a command from an external device (i.e., a host), and execute or control operations to read, write, or erase data in the memory included in the storage device, according to the received command.

The controller may transmit commands to the memory to control the memory. The controller may store commands to be transmitted to the memory in a queue, and reorder the commands stored in the queue to control the memory more efficiently.

The inventions address unintended failures that may occur in the memory when commands transmitted to the memory are lost or modified due to causes such as power instability.

SUMMARY

Embodiments of the present disclosure may provide a storage device capable of efficiently detecting errors that occur in the process of transmitting commands to memory, and an operating method of the storage device.

In one aspect, embodiments of the present disclosure may provide a storage device including i) a memory executing a command set including a plurality of commands, and ii) a controller configured to transmit the command set to the memory, set a plurality of flag bits based on transmission status of the plurality of commands included in the command set, respectively, and determine whether an error occurred in the process of transmitting the command set to the memory based on the plurality of flag bits. Each of the plurality of flag bits may have a first value or a second value, and the command set may include a reset command, a command set start command, and a command set end command.

In another aspect, embodiments of the present disclosure may provide an operating method of a storage device including i) determining a command set including a plurality of commands to be transmitted to a memory, ii) setting a plurality of flag bits depending on whether the plurality of commands included in the command set are transmitted to the memory, and iii) determining whether an error occurred in the process of transmitting the command set to the memory based on the plurality of flag bits. Each of the plurality of flag bits may have a first value or a second value, and the command set may include a reset command, a command set start command, and a command set end command.

According to embodiments of the present disclosure, it is possible to efficiently detect errors that occur in the process of transmitting commands to memory.

DETAILED DESCRIPTION

Figure 1:
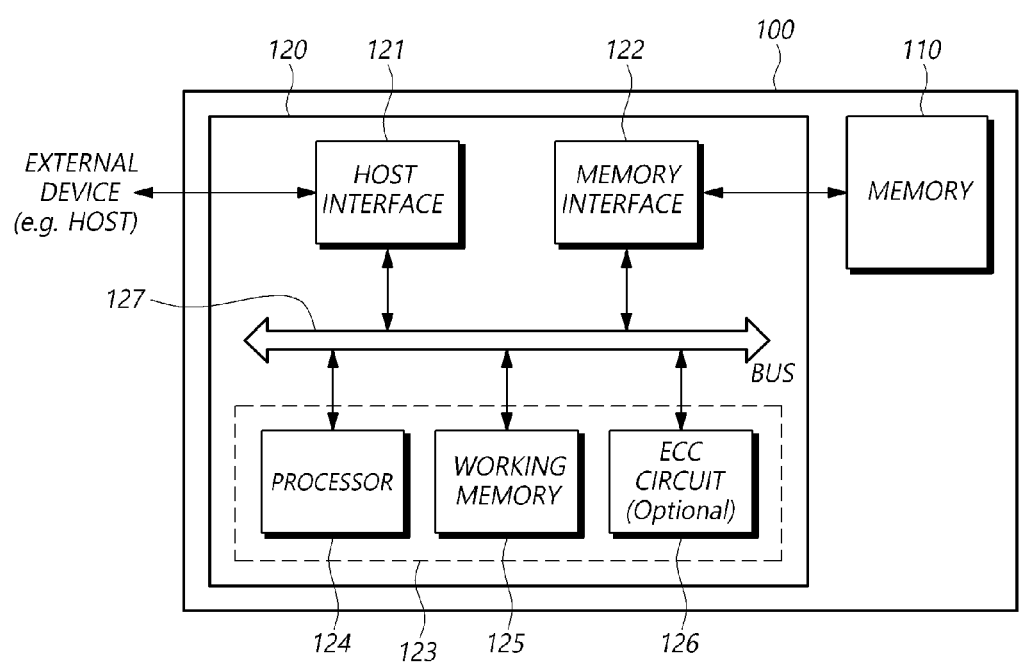
FIG. 1 is a schematic configuration diagram of a storage device according to an embodiment of the disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device according to an embodiment of the disclosure.

Referring to FIG. 1, a storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data. Such a memory cell array may exist in a memory block.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless or in the absence of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any one of various electronic devices that require the storage device 100 to be capable of storing data.

The host may include at least one operating system (OS). The operating system may generally manage and control the function and operation of the host, and may control interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience in explanation, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may execute logical operations required to perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the disclosure will be described as implementing a processor 124 that executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer (FTL), which performs a translating function between a logical address requested to the storage device 100 from the host and a physical address of the memory 110; a host interface layer (HIL), which serves to analyze a command requested to the storage device 100 as a storage device from the host and transfer the command to the flash translation layer (FTL); and a flash interface layer (FIL), which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one from among an SRAM (static RAM), a DRAM (dynamic RAM) and an SDRAM (synchronous DRAM). Meanwhile, the controller 120 may additionally use a separate volatile memory (e.g., SRAM, DRAM) located outside the controller 120 in addition to the working memory 125.

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector that is uncorrectable in read data last. There may be one or more sectors that are determined to be uncorrectable. The error detection and correction circuit 126 may transfer information (e.g., address information) regarding a sector that is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
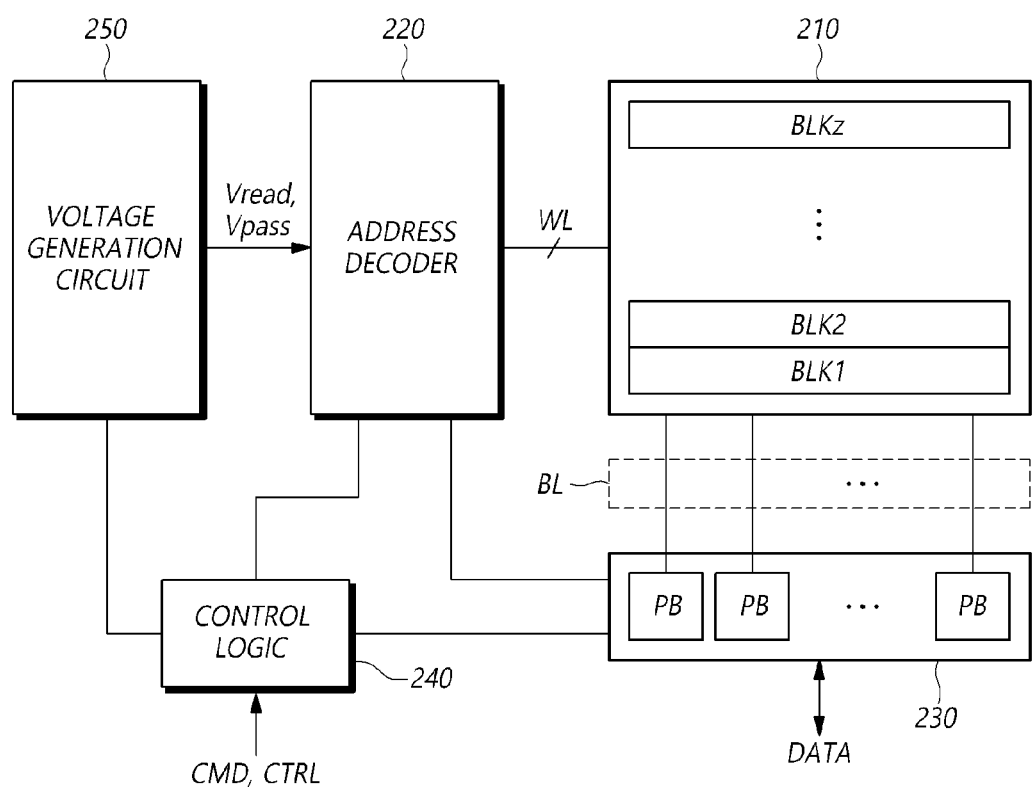
FIG. 2 is a block diagram schematically illustrating a memory of FIG. 1.

FIG. 2 is a block diagram schematically illustrating a memory of FIG. 1.

Referring to FIG. 2, a memory 110 may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a signal level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
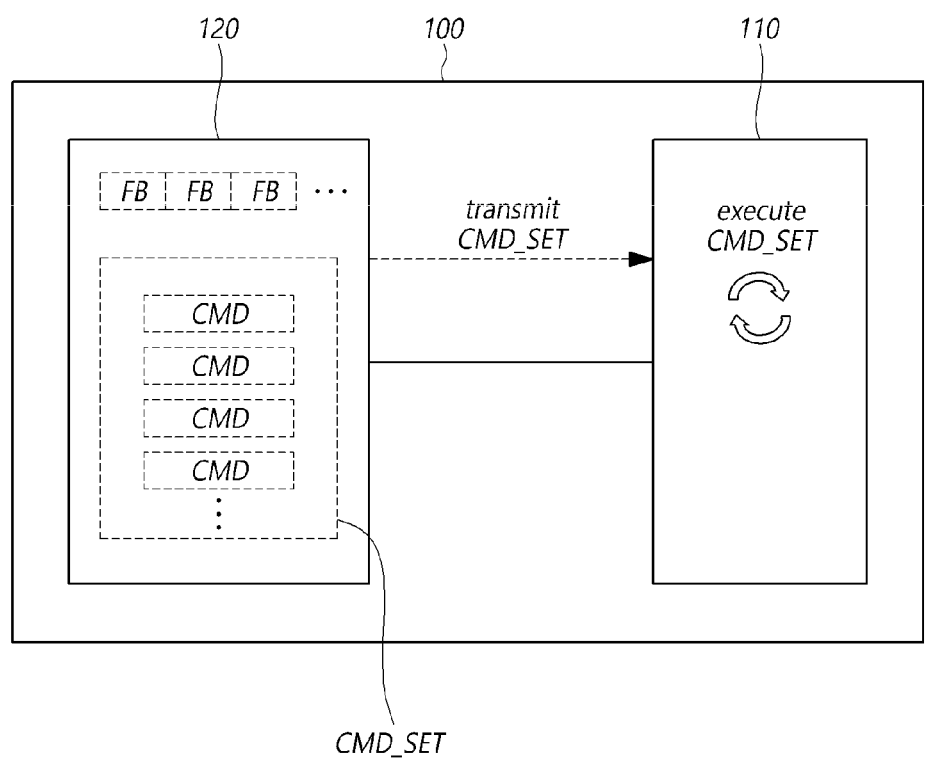
FIG. 3 illustrates a schematic structure and operation of a storage device according to embodiments of the present disclosure.

FIG. 3 illustrates a schematic structure and operation of a storage device according to embodiments of the present disclosure.

Referring to FIG. 3, a storage device 100 may include a memory 110 and a controller 120.

The controller 120 may transmit a command set CMD_SET including a plurality of commands CMD to the memory 110. Transmitting the command set CMD_SET to the memory 110 means transmitting the plurality of commands CMD included in the command set CMD_SET to the memory 110.

The controller 120 may transmit the command set CMD_SET to the memory 110 to control the memory 110 to execute a specific function. The plurality of commands CMD included in the command set CMD_SET may be transmitted to the memory 110 in a preset order. When generating the command set CMD_SET, the controller 120 may determine the order of transmission of the plurality of commands CMD included in the command set CMD_SET. The controller 120 may use the order of transmission to preset the order of transmitting the commands CMD included in the command set CMD_SET.

If the transmission order of the plurality of commands CMD included in the command set CMD_SET deviates from a preset or determined order, or if some of the plurality of commands CMD are missing, then the memory 110 may operate abnormally. Therefore, the controller 120 may need to monitor whether errors occurred in the process of transmitting the plurality of commands CMD included in the command set CMD_SET to the memory 110.

To do so, the controller 120 may set a plurality of flag bits FB based respectively on transmission status of the plurality of commands CMD included in the command set CMD_SET. In an example, the plurality of flag bits FB may be stored in the above-described working memory 125 in FIG. 1 or in separate registers (not shown).

In embodiments of the present disclosure, each of the plurality of flag bits FB may indicate whether a specific command from among a plurality of commands has been successfully transmitted or not to the memory 110. Each of the plurality of flag bits FB may have a first value (e.g., 1) or a second value (e.g., 0).

The controller 120 may determine whether an error occurred in the process of transmitting the command set CMD_SET to the memory 110 based on the plurality of flag bits FB.

A description of the controller 120 determining whether an error occurred in the process of transmitting the command set CMD_SET to the memory 110 based on the plurality of flag bits FB is as follows.

As described above, if the transmission order of the plurality of commands CMD included in the command set CMD_SET changes, or if some of the plurality of commands CMD are missing, then the memory 110 may operate abnormally.

To address such instances, in a comparative example, a controller 120 may use a Low Voltage Drop (LVD) scheme to stop transmitting a plurality of commands CMD to a memory 110 when a voltage drop occurs. However, when the LVD is not activated or when noise that is hard to detect with the LVD occurs, the controller 120 cannot determine whether an error occurred in the process of transmitting the command set CMD_SET to the memory 110 using the LVD scheme.

In disclosed embodiments, the controller 120 may efficiently detect whether an error occurred in the process of transmitting the command set CMD_SET to the memory 110 using the plurality of flag bits FB. The controller 120 may reduce the possibility that the transmission order of the plurality of commands CMD included in the command set CMD_SET is changed from a predetermined order or that some of the plurality of commands CMD are missing.

When a preset enable signal, which indicates whether an error occurred in the process of transmitting the command set CMD_SET is to be determined, is set, or after the order of command transmission has been preset, the controller 120 may determine whether an error occurred in the process of transmitting the command set CMD_SET to the memory 110 based on the plurality of flag bits FB.

The memory 110 may execute the command set CMD_SET received from the controller 120.

Figure 4:
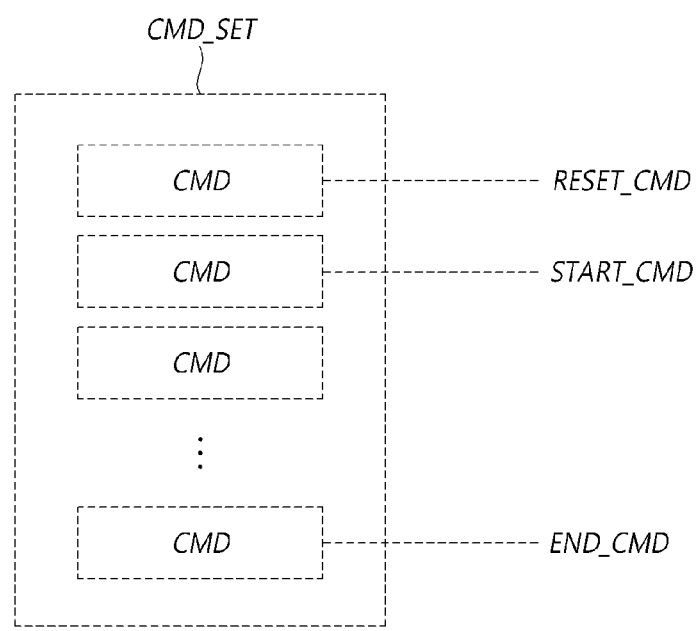
FIG. 4 illustrates an example of a command set according to embodiments of the present disclosure.

FIG. 4 illustrates an example of a command set according to embodiments of the present disclosure.

Referring to FIG. 4, a command set CMD_SET may include a reset command RESET_CMD, a command set start command START_CMD, and a command set end command END_CMD.

The reset command RESET_CMD may be used to initialize a state of a memory 110 so that the memory 110 may execute the command set CMD_SET. The memory 110 may change its state to a default state after receiving the reset command RESET_CMD.

For example, the memory 110 may load default system information stored in the memory 110 in response to the reset command RESET_CMD. The default system information may include parameters related to at least one operation of the memory 110, such as for example a read operation, a program operation, or an erase operation.

The command set start command START_CMD may indicate the start of the command set CMD_SET to the memory 110. When the memory 110 receives the command set start command START_CMD, the memory 110 may determine that commands received thereafter are included in the command set CMD_SET.

The command set end command END_CMD may indicate to the memory 110 that the command set CMD_SET has ended. When the memory 110 receives the command set end command END_CMD, the memory 110 may determine that commands included in the command set CMD_SET are no longer being transmitted.

Figure 5:
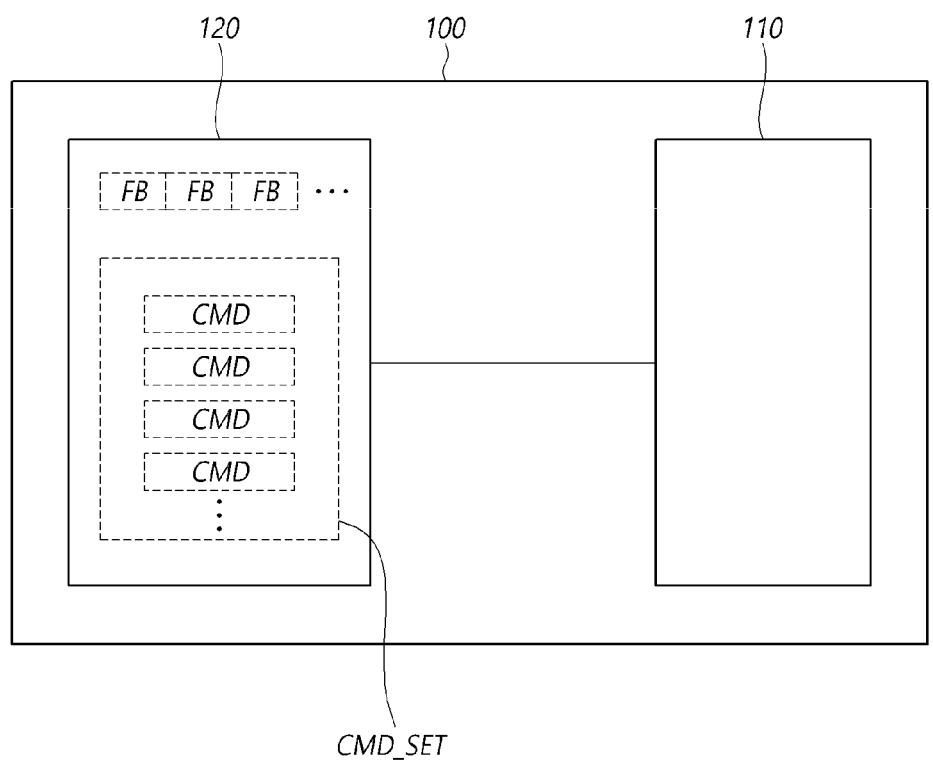
FIG. 5 illustrates an operation in which a storage device initializes a plurality of flag bits according to embodiments of the present disclosure.

FIG. 5 illustrates an operation in which a storage device initializes a plurality of flag bits according to embodiments of the present disclosure.

Referring to FIG. 5, a controller 120 of a storage device 100 may initialize all of a plurality of flag bits FB to a first value VAL_1 before transmitting a command set CMD_SET to a memory 110.

After initializing the plurality of flag bits FB, the controller 120 may determine whether an error occurred in the process of transmitting the command set CMD_SET to the memory 110 based on whether the values of the plurality of flag bits FB change from the first value VAL_1 to a second value VAL_2.

Figure 6:
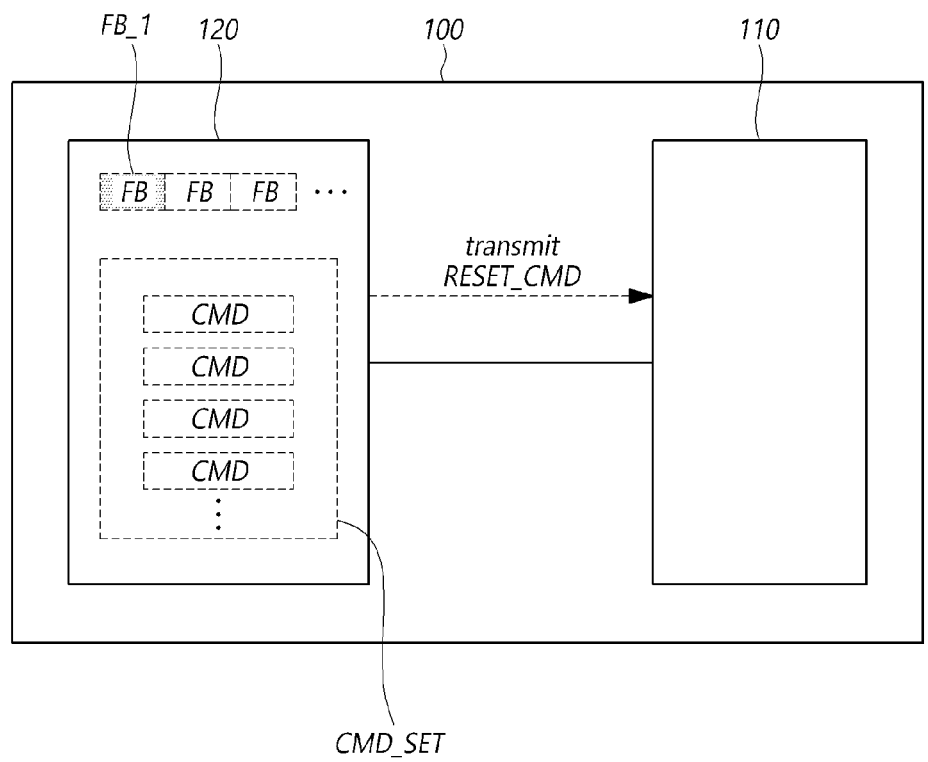
FIG. 6 illustrates an operation in which a storage device transmits a reset command according to embodiments of the present disclosure.

FIG. 6 illustrates an operation in which a storage device transmits a reset command according to embodiments of the present disclosure.

Referring to FIG. 6, a controller 120 of a storage device 100 may set a first flag bit FB_1 among a plurality of flag bits FB from a first value VAL_1 to a second value VAL_2 when transmitting a reset command RESET_CMD to a memory 110.

Therefore, the controller 120 may determine whether the reset command RESET_CMD was successfully transmitted to the memory 110 based on the value of the first flag bit FB_1.

Figure 7:
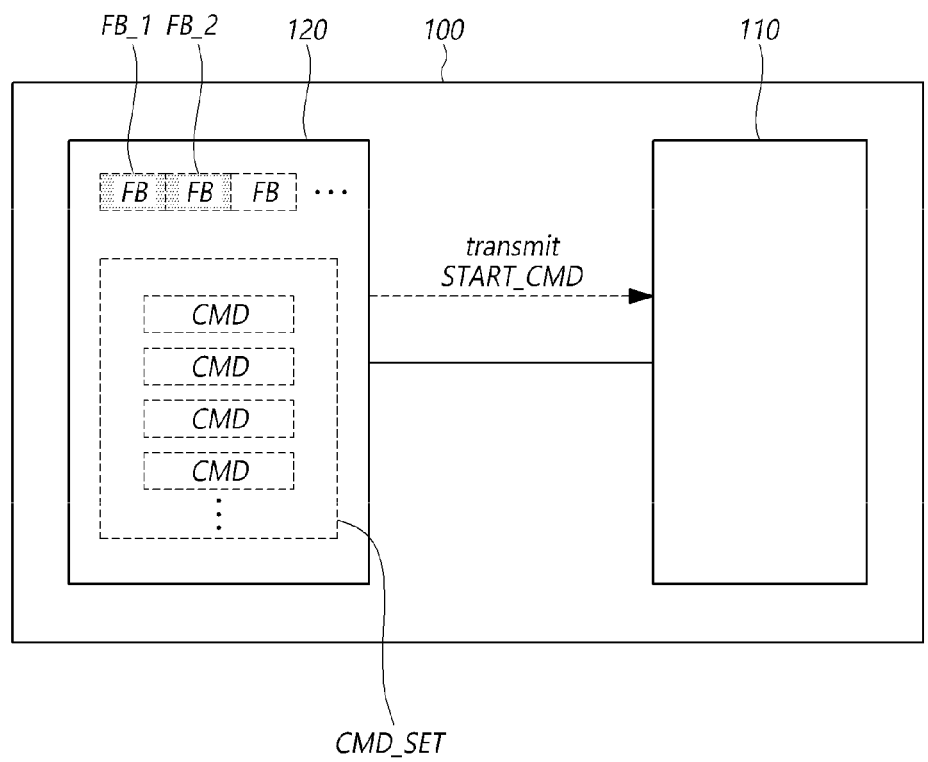
FIG. 7 illustrates an operation in which a storage device transmits a command set start command according to embodiments of the present disclosure.

FIG. 7 illustrates an operation in which a storage device transmits a command set start command START_CMD according to embodiments of the present disclosure.

Referring to FIG. 7, a controller 120 of a storage device 100 may set a second flag bit FB_2 among a plurality of flag bits FB from a first value VAL_1 to a second value VAL_2 when transmitting a command set start command START_CMD to a memory 110. Therefore, the controller 120 may determine whether the command set start command START_CMD has been successfully transmitted to the memory 110 based on the value of the second flag bit FB_2.

As illustrated in FIG. 7, when a first flag bit FB_1 among the plurality of flag bits FB is the second value VAL_2, the controller 120 may set the second flag bit FB_2 from the first value VAL_1 to the second value VAL_2. On the other hand, if the first flag bit FB_1 is the first value VAL_1, then the controller 120 may control the second flag bit FB_2 so that the second flag bit FB_2 cannot be set to the second value VAL_2. If the first flag bit FB_1 remains at the first value VAL_1 after reset command RESET_CMD was transmitted, then it means that the reset command RESET_CMD was not transmitted successfully to the memory. In this case, even if the command set start command START_CMD is transmitted to the memory 110, if the second flag bit FB_2 is changed to the second value VAL_2, the controller 120 would detect the abnormal operation.

Figure 8:
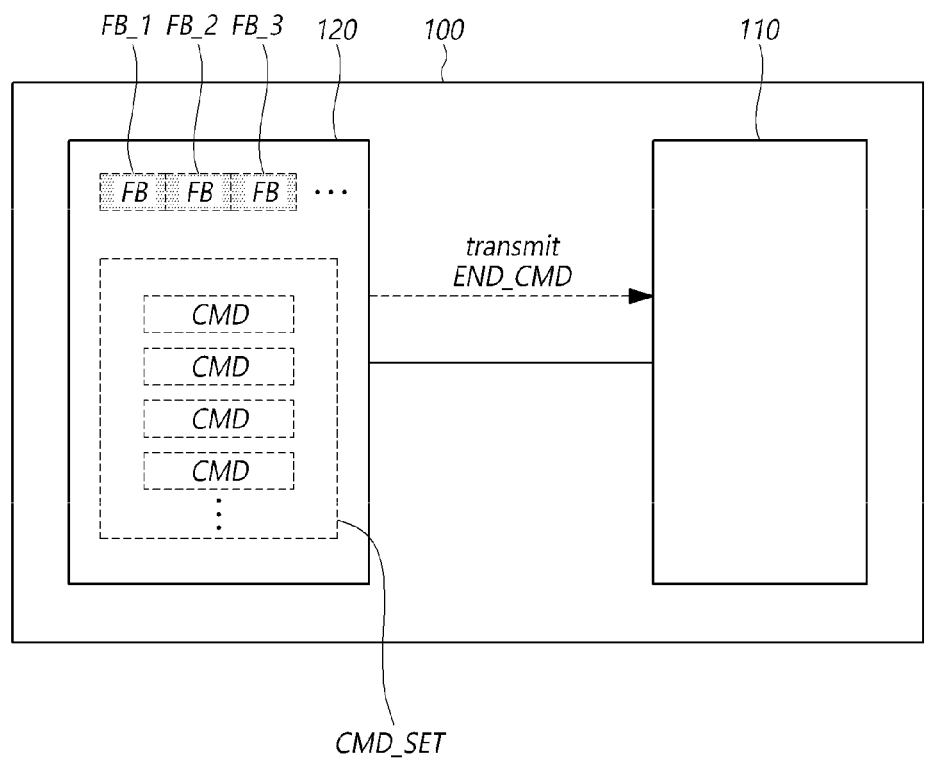
FIG. 8 illustrates an operation in which a storage device transmits a command set end command according to embodiments of the present disclosure.

FIG. 8 illustrates an operation in which a storage device transmits a command set end command END_CMD according to embodiments of the present disclosure.

Referring to FIG. 8, when transmitting a command set end command END_CMD to a memory 110, a controller 120 of a storage device 100 may set a third flag bit FB_3 among a plurality of flag bits FB from a first value VAL_1 to a second value VAL_2. Accordingly, the controller 120 may determine whether the command set end command END_CMD was successfully transmitted to the memory 110 based on the value of the third flag bit FB_3.

As illustrated in FIG. 8, the controller 120 may set the third flag bit FB_3 from the first value VAL_1 to the second value VAL_2 when a first flag bit FB_1 and a second flag bit FB_2 are the second value VAL_2. On the other hand, when either the first flag bit FB_1 or the second flag bit FB_2 is the first value VAL_1, the controller 120 may control the third flag bit FB_3 so that the third flag bit FB_3 cannot be set to the second value VAL_2. If the first flag bit FB_1 or the second flag bit FB_2 is the first value VAL_1, then the reset command RESET_CMD or the command set start command START_CMD was not successfully transmitted to the memory. In this case, if the command set end command END_CMD is transmitted to the memory 110 and the third flag bit FB_3 is changed to the second value VAL_2, then the controller 120 would detect an error in operation.

Figure 9:
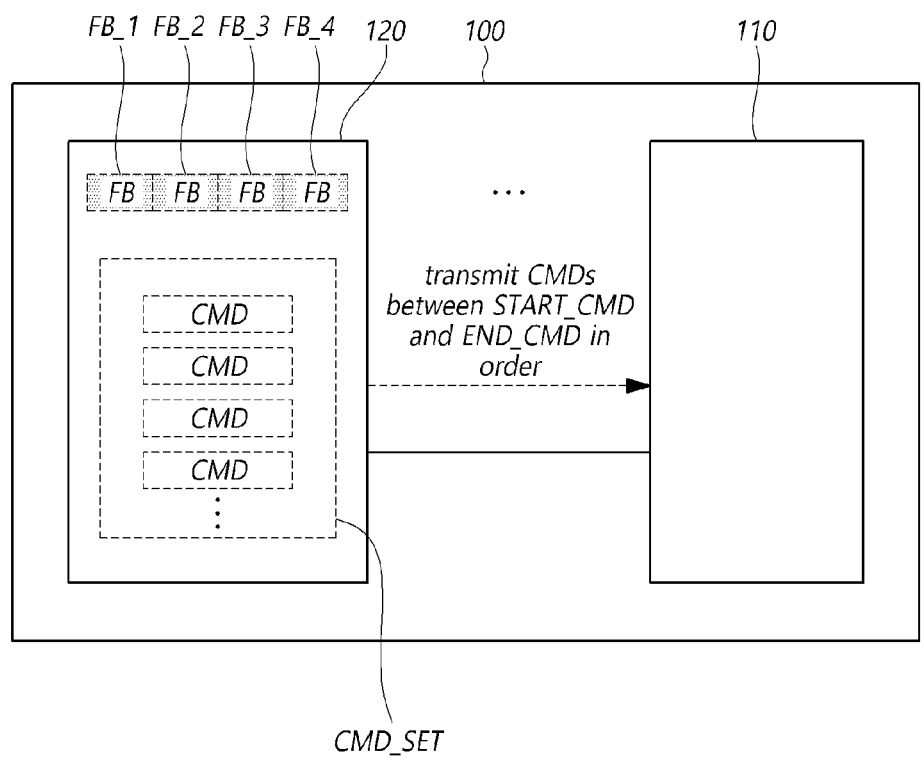
FIG. 9 illustrates an operation in which a storage device transmits one or more commands from among a plurality of commands according to embodiments of the present disclosure.

FIG. 9 illustrates an operation in which a storage device transmits one or more commands from among a plurality of commands according to embodiments of the present disclosure.

Referring to FIG. 9, a controller 120 of a storage device 100 may set a fourth flag bit FB_4 from among a plurality of flag bits FB from a first value VAL_1 to a second value VAL_2 when transmitting one or more commands, from among a plurality of commands CMD, to a memory 110 according to an order set between a command set start command START_CMD and a command set end command END_CMD.

Although not illustrated in FIG. 9, when a second flag bit FB_2 among the plurality of flag bits FB is the second value VAL_2 and a third flag bit FB_3 is still the first value VAL_1, the controller 120 may set the fourth flag bit FB_4 from the first value VAL_1 to the second value VAL_2. On the other hand, the controller 120 may control the fourth flag bit FB_4 so that the fourth flag bit FB_4 cannot be set to the second value VAL_2 when the second flag bit FB_2 is the first value VAL_1 or the third flag bit FB_3 is the second value VAL_2. This is because the second flag bit FB_2 is the second value VAL_2 and the third flag bit FB_3 is the first value VAL_1 in a time period after the command set start command START_CMD is transmitted to the memory 110 and before the command set end command END_CMD is transmitted to the memory 110.

Figure 10:
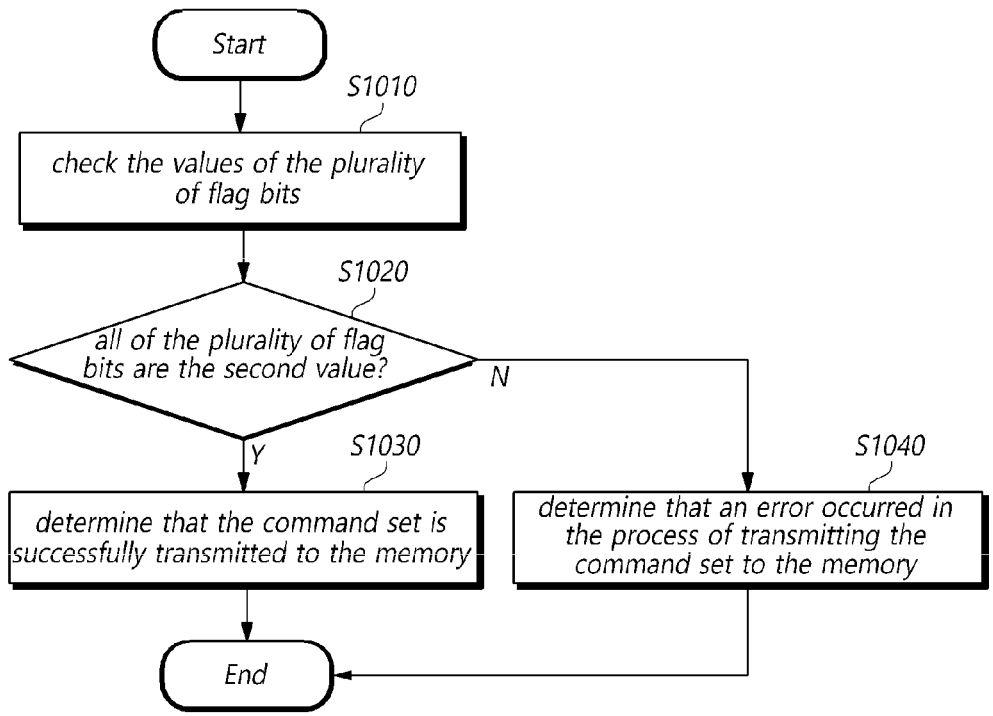
FIG. 10 illustrates a flowchart illustrating an operation in which a storage device determines whether a command set is successfully transmitted according to embodiments of the present disclosure.

FIG. 10 illustrates a flowchart illustrating an operation in which a storage device determines whether a command set is successfully transmitted according to embodiments of the present disclosure.

Referring to FIG. 10, a controller 120 of a storage device 100 may check the values of a plurality of flag bits FB (S1010).

The controller 120 may determine whether all of the plurality of flag bits FB are a second value VAL_2 (S1020).

When all of the plurality of flag bits FB are the second value VAL_2 (S1020-Y), the controller 120 may determine that an entire command set CMD_SET has been successfully transmitted to the memory 110 (S1030). This is because when commands corresponding to the plurality of flag bits FB are successfully transmitted to the memory 110, all of the plurality of flag bits FB should have been changed from the first value VAL_1 to the second value VAL_2.

On the other hand, when a flag bit that is a first value VAL_1 is detected from among the plurality of flag bits FB (S1020-N), the controller 120 may determine that an error occurred in the process of transmitting the command set CMD_SET to the memory 110 (S1040). This is because a flag bit having the first value VAL_1 means that the command corresponding to the flag bit was not successfully transmitted to the memory 110.

Figure 11:
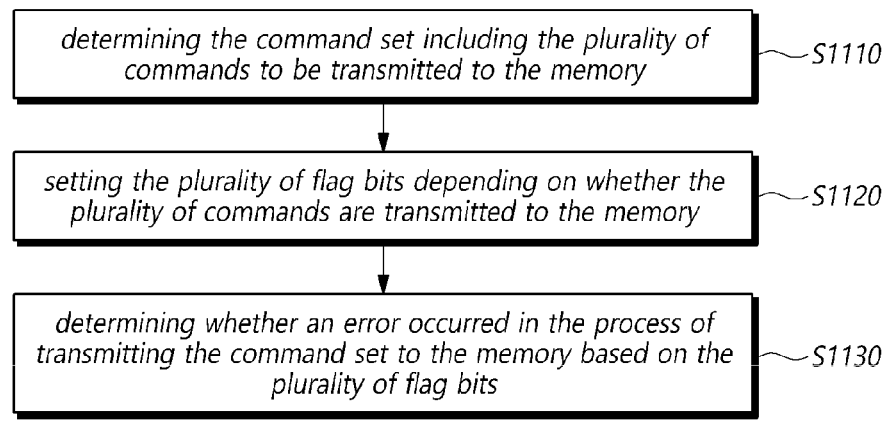
FIG. 11 illustrates an operating method of a storage device according to embodiments of the present disclosure.

FIG. 11 illustrates an operating method of a storage device according to embodiments of the present disclosure.

Referring to FIG. 11, an operating method of a storage device 100 may include determining a command set CMD_SET including a plurality of commands CMD to be transmitted to a memory 110 (S1110).

The command set CMD_SET may include a reset command RESET_CMD, a command set start command START_CMD, and a command set end command END_CMD.

The operating method of the storage device 100 may include setting a plurality of flag bits FB to values that depend on whether the plurality of commands CMD included in the command set CMD_SET are transmitted, respectively, to the memory 110 (S1120).

Each of the plurality of flag bits FB may have a first value VAL_1 or a second value VAL_2.

For example, operation S1120 may include initializing all of the plurality of flag bits FB to the first value before transmitting the command set CMD_SET to the memory 110, and setting a first flag bit FB_1 from the first value VAL_1 to the second value VAL_2 when transmitting the reset command RESET_CMD to the memory 110.

For example, the operation S1120 may further include setting a second flag bit FB_2 from the first value VAL_1 to the second value VAL_2 when transmitting the command set start command START_CMD to the memory 110.

For example, the operation S1120 may also include setting a third flag bit FB_3 from the first value VAL_1 to the second value VAL_2 when transmitting the command set end command END_CMD to the memory 110.

For example, the operation S1120 may include, in addition, setting a fourth flag bit FB_4 from the first value VAL_1 to the second value VAL_2 when transmitting one or more commands, from among the plurality of commands, to the memory 110 according to a determined order between the command set start command START_CMD and the command set end command END_CMD.

The operating method of the storage device 100 may include determining whether an error occurred in the process of transmitting the command set CMD_SET to the memory 110 based on the plurality of flag bits FB (S1130).

For example, the operation S1130 may determine that the command set CMD_SET is successfully transmitted to the memory 110 when all of the plurality of flag bits FB are the second value VAL_2, and may determine that an error occurred in the process of transmitting the command set CMD_SET to the memory 110 when a flag bit that is the first value VAL_1 is detected among the plurality of flag bits FB.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device comprising:
  a memory executing a command set including a plurality of commands; and
  a controller configured to:
  transmit the command set to the memory,
  set, during transmitting the command set in a section without a LVD (low voltage drop) scheme that suspends transmitting the command set when a voltage drop occurs, a plurality of flag bits based on transmission status of the plurality of commands included in the command set, respectively, and
  determine whether an error occurred in the process of transmitting the command set to the memory based on the plurality of flag bits;
  wherein each of the plurality of flag bits has a first value or a second value, and
  wherein the command set includes a reset command, a command set start command, and a command set end command.

2. The storage device according to claim 1,
  wherein the controller is configured to:
  initialize all of the plurality of flag bits to the first value before transmitting the command set to the memory, and
  set a first flag bit, from among the plurality of flag bits, from the first value to the second value when transmitting the reset command to the memory.

3. The storage device according to claim 2,
wherein the controller is configured to:
set a second flag bit, from among the plurality of flag bits, from the first value to the second value when transmitting the command set start command to the memory.

4. The storage device according to claim 3,
wherein the controller is configured to:
set the second flag bit from the first value to the second value when the first flag bit is the second value.

5. The storage device according to claim 3,
wherein the controller is configured to:
set a third flag bit, from among the plurality of flag bits, from the first value to the second value when transmitting the command set end command to the memory.

6. The storage device according to claim 5,
wherein the controller is configured to:
set the third flag bit from the first value to the second value when the first flag bit and the second flag bit are the second value.

7. The storage device according to claim 6,
wherein the controller is configured to:
set a fourth flag bit, from among the plurality of flag bits, from the first value to the second value when transmitting one or more commands, from among the plurality of commands, to the memory according to a preset order from the command set start command to the command set end command.

8. The storage device according to claim 7,
wherein the controller is configured to:
set the fourth flag bit from the first value to the second value when the second flag bit is the second value and the third flag bit is the first value.

9. The storage device according to claim 1,
wherein the controller is configured to:
determine that the command set is successfully transmitted to the memory when all of the plurality of flag bits are the second value, and
determine that an error occurred in the process of transmitting the command set to the memory when a flag bit that is the first value among the plurality of flag bits exists.

10. An operating method of a storage device, the operating method comprising:
determining a command set including a plurality of commands to be transmitted to a memory;
setting, during transmitting the command set in a section without a LVD (low voltage drop) scheme that suspends transmitting the command set when a voltage drop occurs, a plurality of flag bits depending on whether the plurality of commands included in the command set are transmitted to the memory; and
determining whether an error occurred in the process of transmitting the command set to the memory based on the plurality of flag bits;
wherein each of the flag bits has a first value or a second value, and
wherein the command set includes a reset command, a command set start command, and a command set end command.

11. The operating method of claim 10,
wherein the setting the plurality of flag bits comprises:
initializing all of the plurality of flag bits to the first value before transmitting the command set to the memory; and
setting a first flag bit, from among the plurality of flag bits, from the first value to the second value when transmitting the reset command to the memory.

12. The operating method of claim 11,
wherein the setting the plurality of flag bits further comprises:
setting a second flag bit, from among the plurality of flag bits, from the first value to the second value when transmitting the command set start command to the memory.

13. The operating method of claim 12,
wherein the setting the plurality of flag bits further comprises:
setting a third flag bit, from among the plurality of flag bits, from the first value to the second value when transmitting the command set end command to the memory.

14. The operating method of claim 13,
wherein the setting the plurality of flag bits further comprises:
setting a fourth flag bit, from among the plurality of flag bits, from the first value to the second value when transmitting one or more commands, from among the plurality of commands, to the memory according to a preset order between the command set start command and the command set end command.

15. The operating method of claim 10,
wherein the determining whether an error occurred in the process of transmitting the command set to the memory determines that the command set is successfully transmitted to the memory when all of the plurality of flag bits are the second value, and determines that an error occurred in the process of transmitting the command set to the memory when a flag bit that is the first value is detected among the plurality of flag bits.

* * * * *